UNITED STATES PATENT OFFICE.

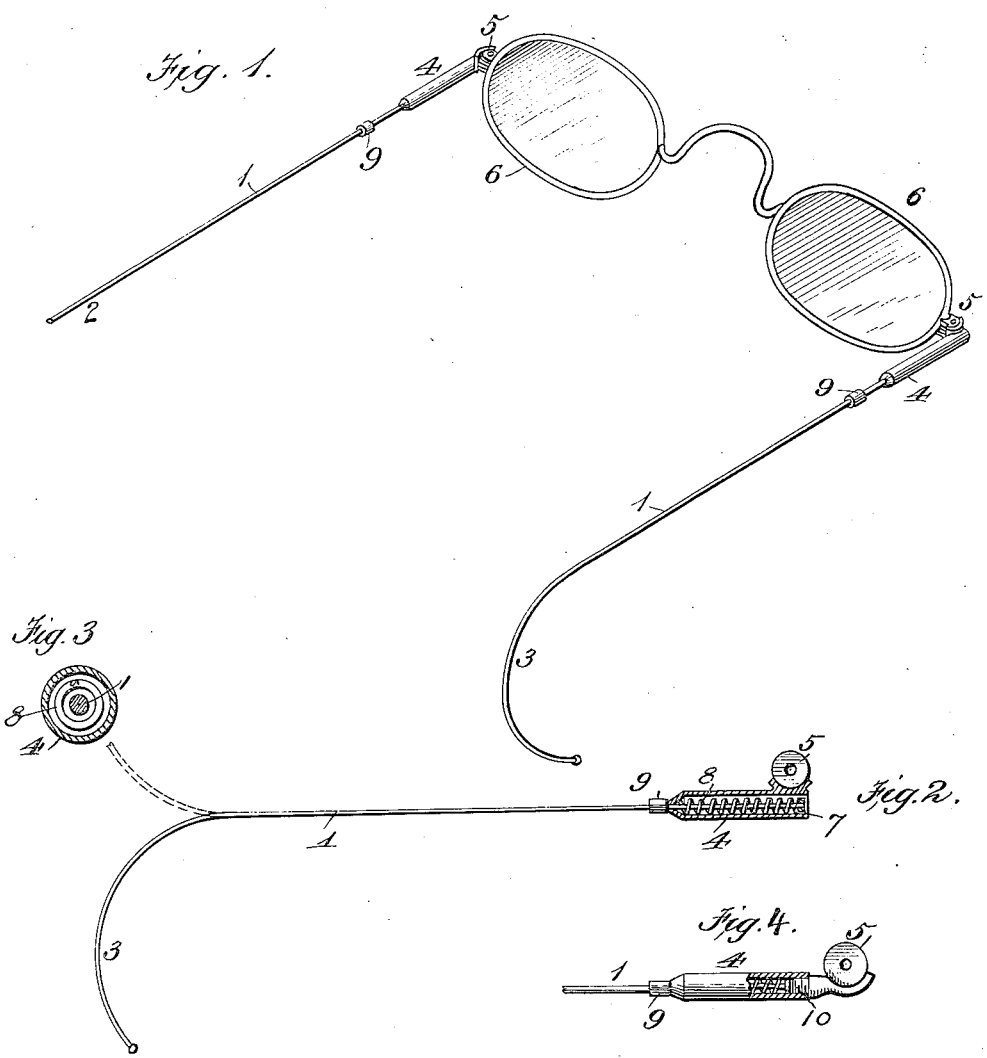

CHARLES E. MIEHLE, OF RIVERSIDE, CALIFORNIA, ASSIGNOR OF ONE-THIRD TO JUDAH S. BAKER, OF SAME PLACE.

SPECTACLES.

SPECIFICATION forming part of Letters Patent No. 633,023, dated September 12, 1899.

Application filed February 1, 1899. Serial No. 704,195. (No model.)

*To all whom it may concern:*

Be it known that I, CHARLES E. MIEHLE, a subject of the Emperor of Germany, residing at Riverside, in the county of Riverside and State of California, have invented a new and useful Improvement in Spectacles, of which the following is a specification.

My invention relates to spectacles, and more particularly to the temples for the same, and has for its object to render the spectacles more easily adjusted to and removed from the head; and it consists in the combination and improved construction of the parts of the temple, as will be hereinafter more particularly set forth.

In the use of spectacles in which the end of the temple is curved to fit behind the ear it has been found difficult to attach and remove them, owing to the necessarily close fit of the curve behind the ear to hold the glasses in their proper position in front of the eyes, and where the hinge portion or ear is rigidly secured to the bow portion it is impossible to use the same temple upon either end of the frame, thereby necessitating the use of a different bow or temple for each side. To obviate these objections, I have found that by making the temple rotatable upon its axis and longitudinally extensible the curved portion can be drawn back beyond the ear and then rotated, so that the tip or curve will pass above the ear, thereby avoiding the liability of breaking, as is the case where the temple is not rotatable. When the temple is non-rotatable, the curve always has the same fixed relation to the frame, and the only way to remove it from behind the ear is to take hold of the tip and bend the curve nearly straight, thereby subjecting it to such a strain as will be liable to break it; but by making the bow portion of the temple rotatable the necessity for straightening the curve is avoided, and it also permits of the temple being used upon either end of the frame, as the ear or hinge portion is so formed as to fit either end of the frame by simply giving it a half-rotation on its axis and then partially rotating the bow to adapt it for engagement with the head of the user.

In the accompanying drawings, in which the same reference-numeral indicates a corresponding part in each of the views in which it occurs, Figure 1 is a perspective view of a spectacle-frame provided with my improved temples. Fig. 2 is a longitudinal sectional view of one of the temples. Fig. 3 is a cross-sectional view taken on the line $x$ $x$ of Fig. 2, and Fig. 4 is a partial sectional view of the end of a temple provided with a plug for closing the end of the barrel and connecting it with the spectacle-frame.

Referring more particularly to the drawings, 1 indicates the temple, the outer end of which may be straight, as shown at 2, or curved, as shown at 3 in Fig. 1. The other or inner end of the temple is provided with a barrel or casing 4, one end of which is perforated for the passage of the bow of the temple and the other end may be open. The barrel may be of any suitable size and length, and the parts may be of any suitable material, as gold, silver, aluminium, &c. The barrel is provided with an ear 5, by means of which it is connected with the frame 6 in the usual manner. The end of the bow within the barrel is provided with a shoulder or collar 7, which fits snugly within the barrel and forms a guide and between which and the opposite end of the barrel fits a suitable spring 8 or other resilient material which will return the bow to its original position after a limited longitudinal movement of the same. A stop or shoulder may be formed upon the bow beyond the end of the barrel by a collar 9 to limit the return movement of the bow by the spring, or, if desired, the stop may be omitted and the return movement regulated by a stop in the barrel, as by partially closing the end of the barrel similar to what is done at the end through which the bow passes, or the end of the barrel may be screw-threaded and have a plug 10 inserted therein, as shown in Fig. 4.

By making the barrel cylindrical in cross-section the bow may be rotated upon its axis, as shown in dotted lines in Fig. 2, whereby the curved end may be moved into and out of the plane it occupies when in position behind the ear, thus permitting its easy manipulation in attaching or removing the glasses, as the bow may be rotated at any position of the collar within the barrel. The rotation of the bow may be effected by rolling it between the fingers or by taking hold of the curved portion of the end, thereby insuring the satisfactory operation of my invention under all circumstances and conditions. The rotation of the bow avoids the strain and liability of breaking the bow at the curve, as is often the case where it must be raised over the ear with the non-rotatable temples, and it also permits of the temple being used upon either side of the head by connecting it to either end of the frame and then rotating it until the curved portion projects downward where a curved bow is used or the clamping portion is inward where the bow is straight. The spring within the casing is only of sufficient strength to cause the bow to fit behind the ear without causing pain or inconvenience, and by inclosing it within the casing it is protected from contact with the fingers, which might cause it to rust and break easily.

In operation the temples are grasped in the usual manner and given a slight roll between the thumb and fingers, which will throw the curved portion out of the plane of the ear. After the bridge of the frame has been placed upon the nose the bow portions are drawn back far enough to clear the ear, and they are then given a partial rotation in a direction opposite to the first rotation, which will throw the curved portion behind the ear. They are then released, when the spring will draw the curve into position behind the ear, and thus hold the glasses in their proper position before the eyes with an easy yielding pressure. In removing the spectacles one or both of the temples is grasped at its straight or curved portion and rotated outwardly, after it has been drawn backward to clear the ear of the operator, and released, which will permit of the glasses being removed. As soon as the spectacles have been released the resiliency of the springs will retract each bow within the barrel, when the temples may be folded over the frame and put in a case, as with the ordinary glasses. When it is desired to again use the spectacles, the foregoing operation is repeated.

By inclosing the spring and the end of the bow in a small barrel the ordinary observer will fail to detect the slight difference in appearance between my improved temple and the temple ordinarily used, thereby securing the great advantage in utility heretofore set forth without detracting from its appearance, which cannot be secured in any other manner.

Having thus described my invention, I claim—

1. In a temple for spectacles, the combination, with a cylindrical barrel, one end of which is perforated and the other end is open of a longitudinally-movable rotatable bow portion, the inner end of which projects through the perforation of the barrel and is provided with a shoulder, a spring upon the bow between the shoulder and the perforated end of the barrel, and means for closing the open end of the barrel and limiting the movement of the bow in one direction.

2. In a temple for spectacles, the combination, with a cylindrical barrel, one end of which is perforated and the other end is open, of a longitudinally-movable rotatable bow portion, the inner end of which projects through the perforation and is provided with a shoulder, a spring upon the bow between the shoulder and the perforated end of the barrel, and a plug for closing the barrel and limiting the longitudinal movement of the bow in one direction, one end of the plug fitting in the barrel and the other end being provided with an ear for engaging with the spectacle-frame, the bore of the barrel being of a greater length than the combined length of the end of the plug in the barrel and the shouldered portion of the bow.

CHARLES E. MIEHLE.

Witnesses:
W. S. BOYD,
J. S. BAKER.